2,798,055

RUBBER COMPOSITIONS CONTAINING TRIAZINE BLOWING AGENTS AND PROCESS FOR PRODUCING CELLULAR RUBBER THEREFROM

Frank A. V. Sullivan, Glenbrook, Conn., assignor to American Cyanamid Company, New York, N. Y., a corporation of Maine No Drawing. Application December 14, 1954, Serial No. 475,267

12 Claims. (Cl. 260—2.5)

The present invention relates to cellular polymeric materials. More particularly, it relates to foam and cellular rubber and plastic materials. Still more particularly, it relates to a method of preparing such cellular polymeric materials using a new class of blowing agents comprising N-substituted benzosulfotriazines.

In the manufacture of cellular polymeric products, any of various chemical compounds known as blowing agents are incorporated into an uncured polymeric material. The resultant mixture is then subjected to curing at an elevated temperature at which temperature gas is liberated from the blowing agent. The gaseous decomposition product thus released "blows" the polymeric material forming minute cells throughout.

Not all chemical compounds which decompose on heating to a gaseous product are necessarily satisfactory for use in the manufacture of cellular rubber and foam plastic masses. There are certain properties which a material must possess to render it a successful blowing agent. For instance, although a blowing agent must be unstable at the treating temperature, it should be stable on storage, shipment and handling. On the other hand, it should not be so unstable at the treating temperature as to decompose explosively. A blowing agent must disperse evenly or dissolve in the polymeric material to permit formation of fine uniform cells rather than coarse cells or even large cavities. It should be nontoxic and odorless as should its decomposition product.

In the manufacture of cellular rubber, decomposition of the blowing agent should not occur until vulcanization has partially proceeded so that the rubber stock has sufficient strength to retain the gaseous decomposition product. Decomposition, however, must occur before vulcanization proceeds to an extent such that cell formation is restricted. Complete evolution of gas should occur occur prior to completion of vulcanization to produce a blown product of as low density as possible. Still further, the blowing agent must not interfere with rubber vulcanization accelerators or other additives, or itself accelerate or retard the vulcanization process.

In the past, both inorganic and organic compounds have been employed as blowing agents. As representative of the former might be mentioned ammonium carbonate, sodium nitrite, sodium bicarbonate and the like. Among the organic compounds which have been found successful to varying degrees are, for example, urea and some of its derivatives, various diazoamino derivatives and certain azonitrile and azodicarboxylic derivatives. Certain hydrazine derivatives of organic sulfonic acids have been found to be particularly promising. Nevertheless, they all lack to varying degrees in one or more of the desired characteristics noted above.

It has now been found in accordance with the present invention, that cellular products of excellent characteristics may be obtained by using as blowing agents various N-substituted benzosulfotriazines. These compounds may be represented by the following formula:

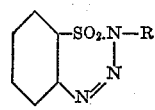

wherein R is an alkyl radical of from 1–6 carbon atoms such as methyl, ethyl, isopropyl, tertiary butyl and the like; an aryl radical of 6–12 carbon atoms; an aralkyl radical such as benzyl, phenylethyl, and the like; a cycloalkyl radical such as cyclobutyl, cyclohexyl, cycloheptyl and the like; and chloro- and hydroxy-substituted derivatives of such alkyl, aryl, aralkyl and cycloalkyl radicals such as hydroxyethyl, chlorophenyl and the like and in which the benzene nucleus may be substituted by halogen, alkyl and alkoxy radicals.

The benzosulfotriazines of this invention may be readily prepared by diazotizing, in the usual manner, the appropriate N-substituted 2-aminobenzene sulfonamide. Upon completion of the diazotization reaction, the diazonium solution is poured into water with stirring. The product separates rapidly as crystals which may be recovered in any manner, such as by filtration, washed with water and dried.

The compounds forming the class of blowing agents in accordance with this invention have been used heretofore for other purposes, for instance, as azo dye compounds for the dyeing and printing of textile materials. It has been previously believed that such compounds were quite stable to both dry and wet heat and that it was possible to heat these products to their melting point with little if any decomposition. It is, therefore, the more surprising that these compounds have been found to be excellent blowing agents in accordance with this invention since it is essential that a blowing agent decomposes rapidly and completely at the curing temperature of the polymer being treated.

The amount of blowing agent employed in accordance with this invention will vary according to the type of product to be blown as well as the degree of blow desired. Thus in the manufacture of cellular rubber products, whether natural rubber or synthetic polymers and copolymers such as polymerized butadiene 1,3, copolymerized butadiene-styrene, butadiene-acrylonitrile and the like, as little as 0.5% by weight on the rubber may be employed. Products of decreasing densities are obtained using greater amounts of blowing agent. In general, the amount of blowing agent employed in the manufacture of cellular rubber will vary from about 0.5% to about 5% on the rubber, usually between about 1% and 3%. In the manufacture of cellular plastic materials, such, for instance, as urea-aldehyde resins, phenolaldehyde resins, vinyl polymers and the like, the amount of blowing agent will generally be greater than that necessary in rubber. In general, this amount will run from about 10% to about 30% by weight on the resin, depending again on the particular blowing agent, the resin to be blown, the degree of blow and the like.

The invention is further demonstrated by the following examples, which are intended to be illustrative only and not by way of limitation. Unless otherwise specified, all parts are by weight.

In each example, samples of each stock are blown at 153° C. for 35 minutes and 130° C. for 60 minutes. The mold load is 6 cubic inches and both high and low loads are blown at each temperature for each stock. In the case of white stock, the respective portions for high and low loads are 51 grams and 42 grams, while for neutral colored stock, they are 48.5 grams and 40 grams.

In order to simplify the examples, the following abbreviations are employed:

COMPOUNDS

MBTS ___ Bisbenzothiazoledisulfide.
DOTG ___ Di-o-tolylguanidine.

DEGREE OF BLOW

C _____ Complete.
SRC _____ Nearly complete, corners slightly rounded.
RC _____ Corners rounded.

CELL STRUCTURE

F _____ Fine.

Example 1

Two rubber stocks, one containing p,p'oxybis(benzene sulfonyl hydrazide), one of the more successful of the commercially available blowing agents, and the other N-phenyl benzosulfotriazine, a blowing agent according to the present invention, are compounded according to the following composition:

| Compound: | Parts |
|---|---|
| Pasticized smoked sheet | 100 |
| 2,2'-methylene-bis(4-methyl-6-t-butylphenol) | 0.5 |
| Stearic acid | 2 |
| Sulfur | 3 |
| Petrolatum | 3 |
| Keystone Whiting | 50 |
| Light process oil | 10 |
| Zinc oxide | 5 |
| MBTS | 0.6 |
| DOTG | 0.15 |
| Blowing agent | 1.5 |

Samples of each stock are blown as described above. Results are recorded in Table I.

TABLE I

| Blowing Agent | Blown at 130° C. for 60 min. | | | | Blown at 153° C. for 35 min. | | | |
|---|---|---|---|---|---|---|---|---|
| | Low Load (40 g.) | | High Load (48.5 g.) | | Low Load (40 g.) | | High Load (48.5 g.) | |
| | Blow | Cells | Blow | Cells | Blow | Cells | Blow | Cells |
| p,p'-oxybis(benzene sulfonylhydrazide) | C | F | C | F | RC | F | C | F |
| N-phenylbenzosulfotriazine | C | F | C | F | RC | F | C | F |

The data of Table I indicate that the N-phenylbenzosulfotriazine of this invention produces as complete a blow and a product having as uniform and fine cell structure as that obtained with the excellent commercially available p,p'-oxybis(benzene sulfonylhydrazide).

Example 2

Two rubber stocks employing p,p'-oxybis(benzenesulfonylhydrazide) and N-t-butylbenzosulfotriazine as blowing agents were compounded according to the following composition:

| Compound: | Parts |
|---|---|
| Plasticized pale crepe | 100 |
| Stearic acid | 2 |
| Zinc oxide | 5 |
| Keystone Whiting | 50 |
| Unitane O-220 (Titanium dioxide) | 15 |
| Light process oil | 10 |
| Petrolatum | 3 |
| 2,2'methylene bis(4-methyl-6-t-butylphenol) | 0.5 |
| Sulfur | 3 |
| MBTS | 0.6 |
| DOTG | 0.15 |
| Blowing agent | 1.5 |

A third rubber stock was prepared also according to the above composition but employing 2.03 parts instead of 1.5 parts N-t-butylbenzosulfotriazine. This provided an active nitrogen equivalence to that present in 1.5 parts of p,p'-oxybis(benzenesulfonylhydrazide). Samples of each of the three stocks were blown under conditions described above. Results are shown in Table II.

TABLE II

| Blowing Agent | Blown at 130°C. for 60 min. | | | | Blown at 153°C. for 35 min. | | | |
|---|---|---|---|---|---|---|---|---|
| | Low Load (42 g.) | | High Load (51 g.) | | Low Load (42 g.) | | High Load (51 g.) | |
| | Blow | Cells | Blow | Cells | Blow | Cells | Blow | Cells |
| p,p'-oxybis (benzene sulfonylhydrazide) | RC | F | C | F | SRC | F | C | F |
| N-t-butylbenzosulfotriazine (1.5) | RC | F | C | F | SRC | F | C | C |
| N-t-butylbenzosulfotriazine (2.03) | C | F | C | F | C | F | C | F |

The results of Table II indicate that when using equal amounts by weight of N-t-butylbenzosulfotriazine and p,p'-oxybis(benzenesulfonylhydrazide) blown products of similar properties are obtained. When using an amount of N-t-butylbenzosulfotriazine sufficient to provide an active nitrogen content equivalent to that in a predetermined amount of p,p'-oxybis(benzenesulfonylhydrazide), a superior blown product is obtained than is obtained using the latter.

Example 3

Two samples of rubber stock of the composition of Example 2 but having incorporated therein the blowing agents indicated in Table III were blown under the conditions described above. Results are shown in Table III.

TABLE III

| Blowing Agent | Blown at 130°C. for 60 min. | | | | Blown at 153°C. for 35 min. | | | |
| --- | --- | --- | --- | --- | --- | --- | --- | --- |
| | Low Load (42 g.) | | High Load (51 g.) | | Low Load (42 g.) | | High Load (51 g.) | |
| | Blow | Cells | Blow | Cells | Blow | Cells | Blow | Cells |
| p,p'-oxybis (benzene sulfonylhydrazide) | RC | F | C | F | SRC | F | C | F |
| N-methylbenzosulfotriazine | RC | F | C | F | SRC | F | C | F |

Again an excellent blowing product is obtained using a blowing agent in accordance with this invention.

Example 4

Two samples of rubber stock having the composition set forth in Example 2 were again blown using as blowing agents the compounds indicated in Table IV. Results are shown in Table IV.

TABLE IV

| Blowing Agent | Blown at 130°C. for 60 min. | | | | Blown at 153°C. for 35 min. | | | |
| --- | --- | --- | --- | --- | --- | --- | --- | --- |
| | Low Load (42 g.) | | High Load (51 g.) | | Low Load (42 g.) | | High Load (51 g.) | |
| | Blow | Cells | Blow | Cells | Blow | Cells | Blow | Cells |
| p,p'-oxybis(benzene sulfonylhydrazide) | RC | F | C | F | SRC | F | C | F |
| N-cyclohexylbenzosulfotriazine | RC | F | C | F | SRC | F | SRC | F |

As in Examples 1-3, an excellent blown product is obtained with the compound of this invention comparing favorably with that obtained using p,p'oxybis(benzenesulfonylhydrazide).

What is claimed is:

1. A process of producing a cellular rubber product selected from the group consisting of natural rubber and rubber-like polymers of a butadiene-1,3 which comprises incorporating into an unvulcanized, vulcanizable rubber composition an N-substituted-benzosulfotriazine of the formula

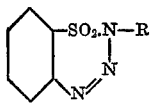

wherein R is selected from the group consisting of alkyl radicals of 1-6 carbon atoms, aryl radicals of 6-12 carbon atoms, aralkyl radicals, cycloalkyl radicals, and chloro- and hydroxy-derivatives of such radicals; and curing the composition.

2. A process according to claim 1 in which the benzosulfotriazine is N-phenylbenzosulfotriazine.
3. A process according to claim 1 in which the benzosulfotriazine is N-t-butylbenzosulfotriazine.
4. A process according to claim 1 in which the benzosulfotriazine is N-methylbenzosulfotriazine.
5. A process according to claim 1 in which the benzosulfotriazine is N-cyclohexylbenzosulfotriazine.
6. A process according to claim 1 in which the benzosulfotriazine is N-isopropylbenzosulfotriazine.
7. An unvulcanized, vulcanizable rubber composition comprising an elastomer selected from the group consisting of natural rubber and rubber-like polymers of a butadiene-1,3 having incorporated therein an N-substituted benzosulfotriazine of the formula

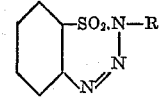

wherein R is selected from the group consisting of alkyl radicals of 1-6 carbon atoms, aryl radicals of 6-12 carbon atoms, aralkyl radicals, cycloalkyl radicals and chloro- and hydroxy-derivatives of such radicals.

8. A composition according to claim 7 in which the benzosulfotriazine is N-phenylbenzosulfotriazine.
9. A composition according to claim 7 in which the benzosulfotriazine is N-t-butylbenzosulfotriazine.
10. A composition according to claim 7 in which the benzosulfotriazine is N-methylbenzosulfotriazine.
11. A composition according to claim 7 in which the benzosulfotriazine is N-cyclohexylbenzosulfotriazine.
12. A composition according to claim 7 in which the benzosulfotriazine is N-isopropyl benzosulfotriazine.

References Cited in the file of this patent

UNITED STATES PATENTS 2,588,885    Schlessinger _____ Mar. 11, 1952